(12) United States Patent
Bagdonis

(10) Patent No.: US 8,550,950 B2
(45) Date of Patent: Oct. 8, 2013

(54) PLANETARY REDUCTION GEARBOX

(75) Inventor: Guthrie Bagdonis, Marlborough, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 235 days.

(21) Appl. No.: 13/022,384

(22) Filed: Feb. 7, 2011

(65) Prior Publication Data

US 2011/0195815 A1    Aug. 11, 2011

Related U.S. Application Data

(60) Provisional application No. 61/301,885, filed on Feb. 5, 2010.

(51) Int. Cl.
*F16H 48/06* (2006.01)

(52) U.S. Cl.
USPC .......................................... 475/221; 475/330

(58) Field of Classification Search
USPC .......... 475/220, 221, 242, 329–332, 338, 339
See application file for complete search history.

(56) References Cited

U.S. PATENT DOCUMENTS

| | | | | |
|---|---|---|---|---|
| 2,480,806 A | * | 8/1949 | Desmoulins | 416/129 |
| 4,964,844 A | * | 10/1990 | Bagnall | 475/295 |
| 5,472,387 A | * | 12/1995 | Kamlukin | 475/338 |
| 5,554,082 A | * | 9/1996 | Umeyama et al. | 475/338 |
| 5,692,989 A | * | 12/1997 | Kamlukin | 475/346 |
| 6,878,090 B2 | * | 4/2005 | Kakeno | 475/339 |
| 6,966,865 B2 | * | 11/2005 | Drago et al. | 475/338 |
| 7,198,223 B2 | * | 4/2007 | Phelps et al. | 244/17.11 |
| 2003/0022751 A1 | * | 1/2003 | Amparore et al. | 475/339 |
| 2006/0135312 A1 | * | 6/2006 | Shiina et al. | 475/339 |

* cited by examiner

*Primary Examiner* — Justin Holmes
(74) *Attorney, Agent, or Firm* — Cantor Colburn LLP

(57) ABSTRACT

A gearbox assembly includes a yoke operably connectable to an input shaft and rotatable about a stationary gear located at a central axis. A planetary gear is rotatably located in the yoke and is meshable with the stationary gear such that rotation of the yoke about the stationary gear drives rotation of the planetary gear, via the mesh between the planetary gear and the stationary gear, about a pin axis. An intermediate gear is located substantially coaxially with the planetary gear and is operably connected to the planetary gear such that rotation of the planetary gear about the pin axis drives rotation of the intermediate gear about the pin axis. At least one output gear is located at the central axis and is operably meshed to the intermediate gear.

12 Claims, 6 Drawing Sheets

PLANETARY REDUCTION GEARBOX

CROSS-REFERENCE TO RELATED APPLICATIONS

This application claims priority to provisional application 61/301,885 filed on Feb. 5, 2010, the contents of which are incorporated by reference herein in their entirety.

BACKGROUND OF THE INVENTION

The subject matter disclosed herein relates to drive trains. More specifically, the subject disclosure relates to gearboxes for rotary-wing aircraft.

Rotary-wing aircraft require a gearbox to transfer power from the engine or engines to the rotary wing. Since the desired rotational velocity of the rotor is lower than that of the engine, the rotational velocity transferred from the engine to the rotor must be reduced in the gearbox via a gear reduction system. The velocity reduction is accomplished via one or more intermediate gears between the engine and an output gear which drives the rotor. The rotational velocity reduction via these intermediate gears also increases a torque transferred to the output gear, so that the output gear size must be increased to withstand the torque applied. In some rotary-wing aircraft, especially ones with two counter-rotating rotors, the resulting gearbox is large and heavy. Since both space and weight are at a premium in any aircraft, the art would favorably receive a rotary ring aircraft gearbox which has improvements in size and weight.

BRIEF DESCRIPTION OF THE INVENTION

According to one aspect of the invention, a gearbox assembly includes a yoke operably connectable to an input shaft and rotatable about a stationary gear located at a central axis. A planetary gear is rotatably located in the yoke and is meshable with the stationary gear such that rotation of the yoke about the stationary gear drives rotation of the planetary gear about a pin axis, via the mesh of the planetary gear to the stationary gear. An intermediate gear is located substantially coaxially with the planetary gear and is operably connected to the planetary gear such that rotation of the planetary gear about the pin axis drives rotation of the intermediate gear about the pin axis. At least one output gear is located at the central axis and is operably meshed to the intermediate gear.

According to another aspect of the invention, a powertrain for a rotary wing aircraft includes an engine having an engine shaft and a gearbox assembly. The gearbox assembly includes a yoke operably connected to the engine shaft and rotatable about a stationary gear located at a central axis. A planetary gear is rotatably positioned in the yoke and is meshable with the stationary gear such that rotation of the yoke about the stationary gear drives rotation of the planetary gear about a pin axis, via the mesh of the planetary gear to the stationary gear. An intermediate gear is located substantially coaxial with the planetary gear and is operably connected to the planetary gear such that rotation of the planetary gear about the pin axis drives rotation of the intermediate gear about the pin axis. At least one output gear is positioned at the central axis and is operably meshed to the intermediate gear. At least one rotor is operably connected to the at least one output gear.

According to yet another aspect of the invention, a method of rotational energy transmission includes locating a stationary gear at a central axis. A yoke is operably connected to an input shaft, the yoke rotatable about the stationary gear. A planetary gear is located in the yoke and is meshed to the stationary gear. An intermediate gear is operably connected to and coaxial with the planetary gear at a pin axis. At least one output gear is located at the central axis and is meshed with the intermediate gear. Rotation of the yoke is urged about the central axis such that the rotation of the yoke about the central axis urges rotation of the planetary gear about the pin axis thereby driving rotation of the intermediate gear about the pin axis thereby rotating at least one output gear about the central axis.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
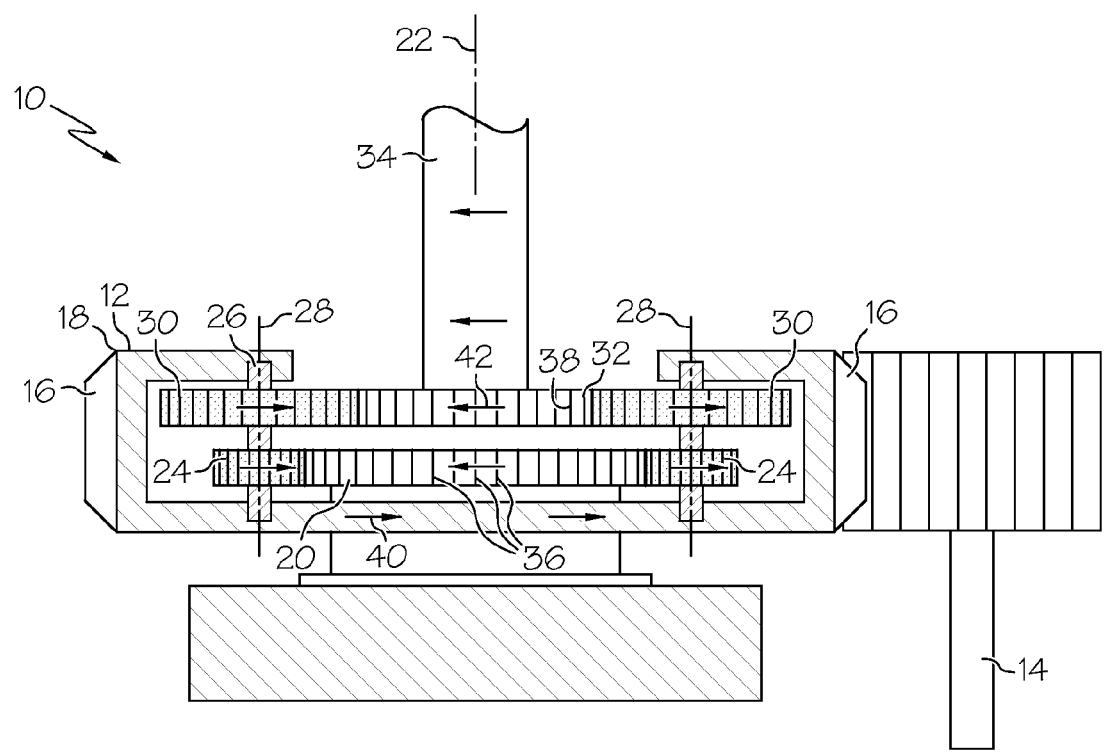
FIG. 1 is a cross-sectional view of an embodiment of a gearbox assembly.

Shown in FIG. 1 is an embodiment of a gearbox assembly 10. The gearbox assembly 10 includes a yoke 12, which in some embodiments, is cylindrical in shape. The yoke 12 is connected to an input shaft 14 via, for example, a plurality of spline teeth 16 disposed at an exterior perimeter 18 of the yoke 12. The yoke 12 is connected to the input shaft 14 such that rotation of the input shaft 14 drives rotation of the yoke 12. A stationary gear 20 is located at a central axis 22 of the gearbox assembly 10 such that, when driven by the input shaft 14, the yoke 12 rotates about the stationary gear 20. In some embodiments, the input shaft 14 includes, for example, a bull gear or a bevel gear to engage the yoke 12.

The gearbox assembly 10 includes a plurality of planetary gears 24 arranged around and meshing with the stationary gear 20. The planetary gears 24 are secured to a pin 26 of a plurality of pins 26 extending through each planetary gear 24 of the plurality of planetary gears 24. The plurality of pins 26 are retained in the yoke 12 such that each pin 26 (and the planetary gears 24 attached thereto) are rotatable about a pin axis 28. As is shown in FIG. 1, in some embodiments, the planetary gears 24 are arrayed in a substantially planar arrangement, but other configurations of planetary gears 24 are contemplated within the present scope. Each pin 26 also includes at least one intermediate gear 30 of a plurality of intermediate gears 30 secured thereto. The plurality of intermediate gears 30 rotate with the plurality of pins 26 and drive an output gear 32. The output gear 32, in turn, drives an output shaft 34 connected to the output gear 32 at the central axis 22.

The speed and direction of rotation of the output gear 32 and the output shaft 34 depends on a difference in circumference between the stationary gear 20 and the output gear 32. For example, in a gearbox assembly 10 where the stationary gear 20 is configured with 100 stationary gear teeth 36 and the output gear 32 is configured with 75 output gear teeth 38, for every four revolutions of the yoke 12 in a first direction 40 about the central axis 22, the output gear 32 will complete one revolution in a second direction 42, opposite the first direction 40. To reverse direction of rotation of the output gear 32, the output gear 32 may be configured with a greater number of output gear teeth 38 than the number of stationary gear teeth 36. The quantities of stationary gear teeth 36 and output gear teeth 38 described herein are merely examples utilized for illustrative purposes and it is to be appreciated that any combination of quantities of output gear teeth 38 and stationary gear teeth 36 may be used to result in a desired speed and/or direction of rotation of the output gear 32 and output shaft 34.

Figure 2:
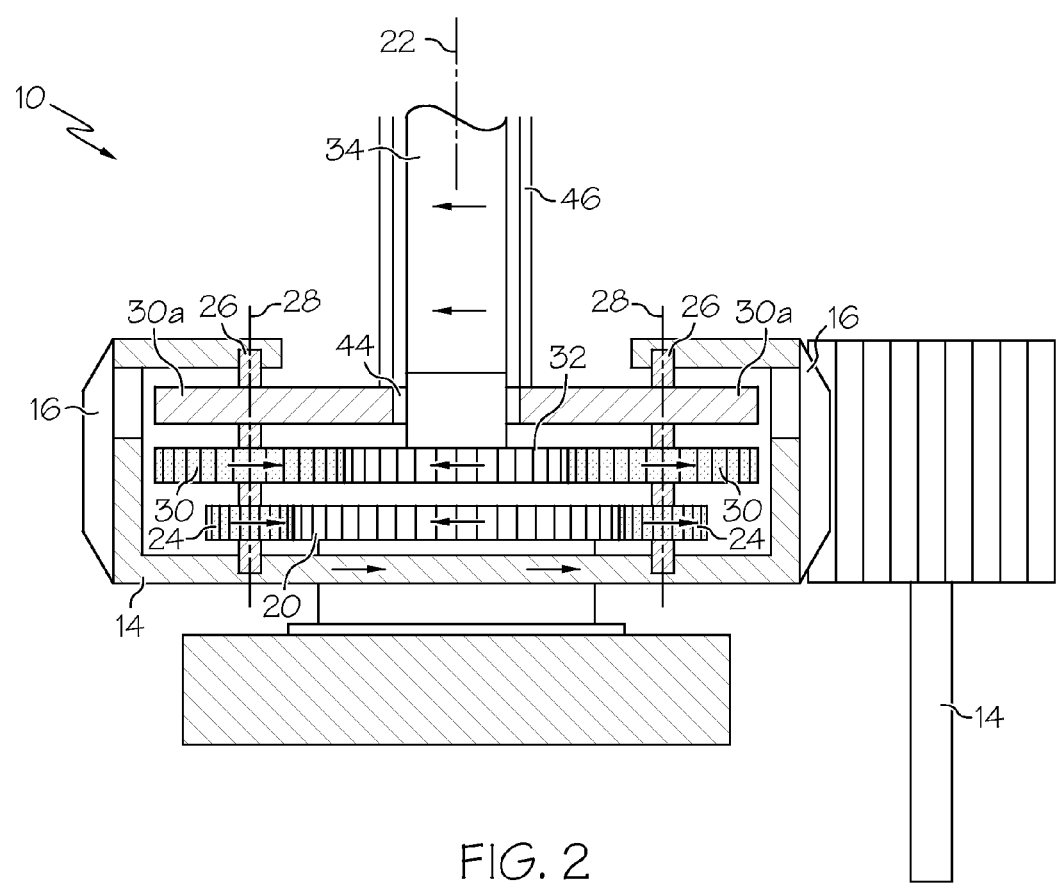
FIG. 2 is a cross-sectional view of another embodiment of a gearbox assembly.

As shown in FIG. 2, the gearbox assembly 10 may be used to drive more than one output shaft, for example two output shafts coaxially via one input shaft 14. This is accomplished by utilizing an additional layer of intermediate gears 30a secured to the plurality of pins 26. The additional intermediate gears 30a mesh with a secondary output gear 44. The secondary output gear 44 is secured to a secondary output shaft 46 which, as shown, may have a larger diameter than the output shaft 34 such that the output shaft 34 is located inside of the secondary output shaft 46. Alternatively, the secondary output shaft 46 may be disposed inside of the output shaft 34. Similar to the embodiment shown in FIG. 1, rotation of the yoke 12 about the central axis 22 drives the planetary gears 24 which causes rotation of the pins 26 and the attached intermediate gears 30 and 30a. Rotation of the intermediate gears 30 drives rotation of the output gear 32 and its associated output shaft 34 while rotation of the intermediate gears 30a drives rotation of the secondary output gear 44 and its associated secondary output shaft 46. The relative speed and direction of the rotation of the output shaft 34 and the secondary output shaft 46 can be established by sizing the output gear 32 and the secondary output gear 44 accordingly relative to the stationary gear 20. While two coaxial output shafts 34 and 46 are shown in FIG. 2, it is to be appreciated that the gearbox assembly 10 may be adapted to drive any number of output shafts for example, three or four output shafts, by providing additional sets of intermediate gears 30 to mesh with additional output gears 32.

Figure 3:
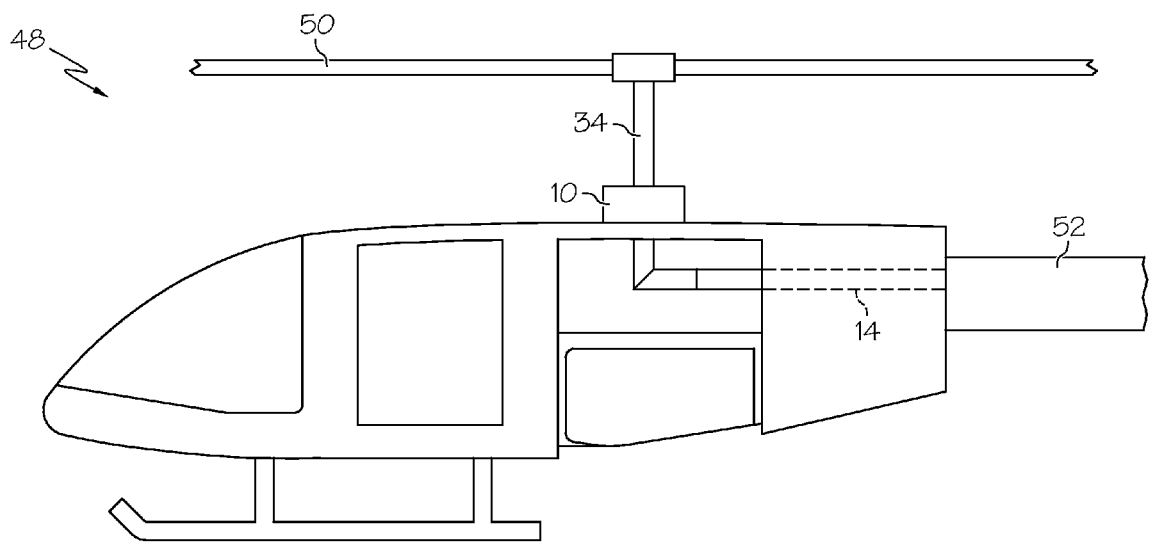
FIG. 3 is a schematic view of an embodiment of a rotary-wing aircraft.

Shown in FIG. 3 is an example of an application of the gearbox assembly 10. Shown is a cross-sectional view of a rotary wing aircraft 48. The aircraft 48 includes a rotor 50 connected to the gearbox assembly 10 via the output shaft 34. An engine 52 is configured to provide power to the gearbox assembly 10 via the input shaft 14, and rotational energy of the engine 52 is transferred into rotation of the rotor 50 in a desired direction at a desired speed via the gearbox assembly 10 as described above.

Figure 4:
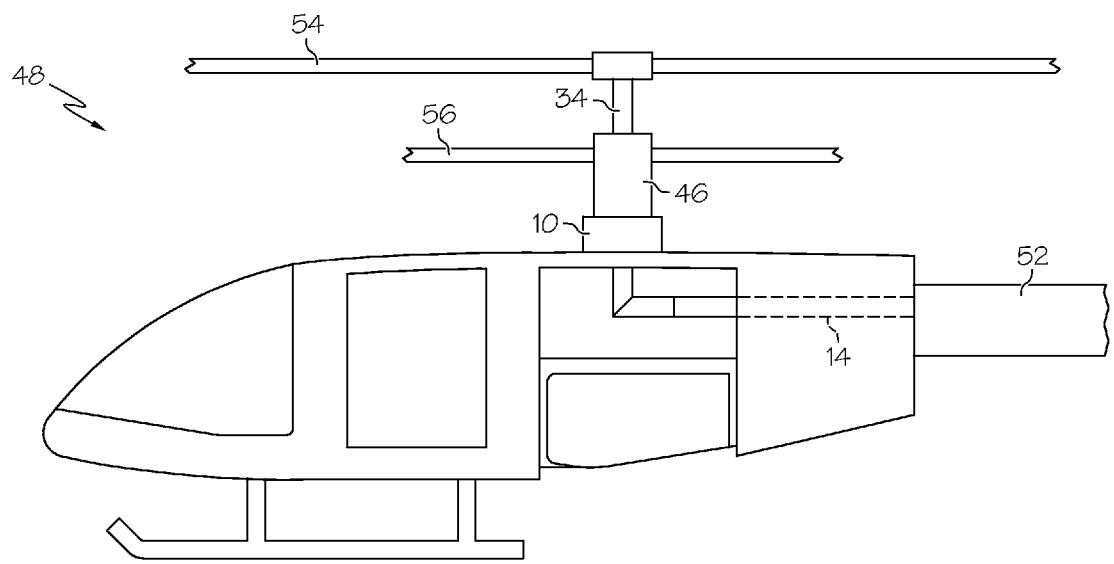
FIG. 4 is a schematic view of another embodiment of a rotary-wing aircraft.

Another embodiment is illustrated in FIG. 4. In this embodiment, the rotary wing aircraft 48 includes an upper rotor 54 and a lower rotor 56 which is coaxial to the upper rotor 54. The upper rotor 54 is connected to the gearbox assembly 10 via the output shaft 34 and the lower rotor 56 is connected to the gearbox assembly 10 via the secondary output shaft 46. Referring again to FIG. 2, in such embodiments, the gearbox assembly 10 is configured with a plurality of the intermediate gears 30 which mesh with the output gear 32 to drive rotation of the output shaft 34. A plurality of intermediate gears 30a are provided to mesh with the secondary output gear 44 which drives rotation of the secondary output shaft 46.

Figure 5:
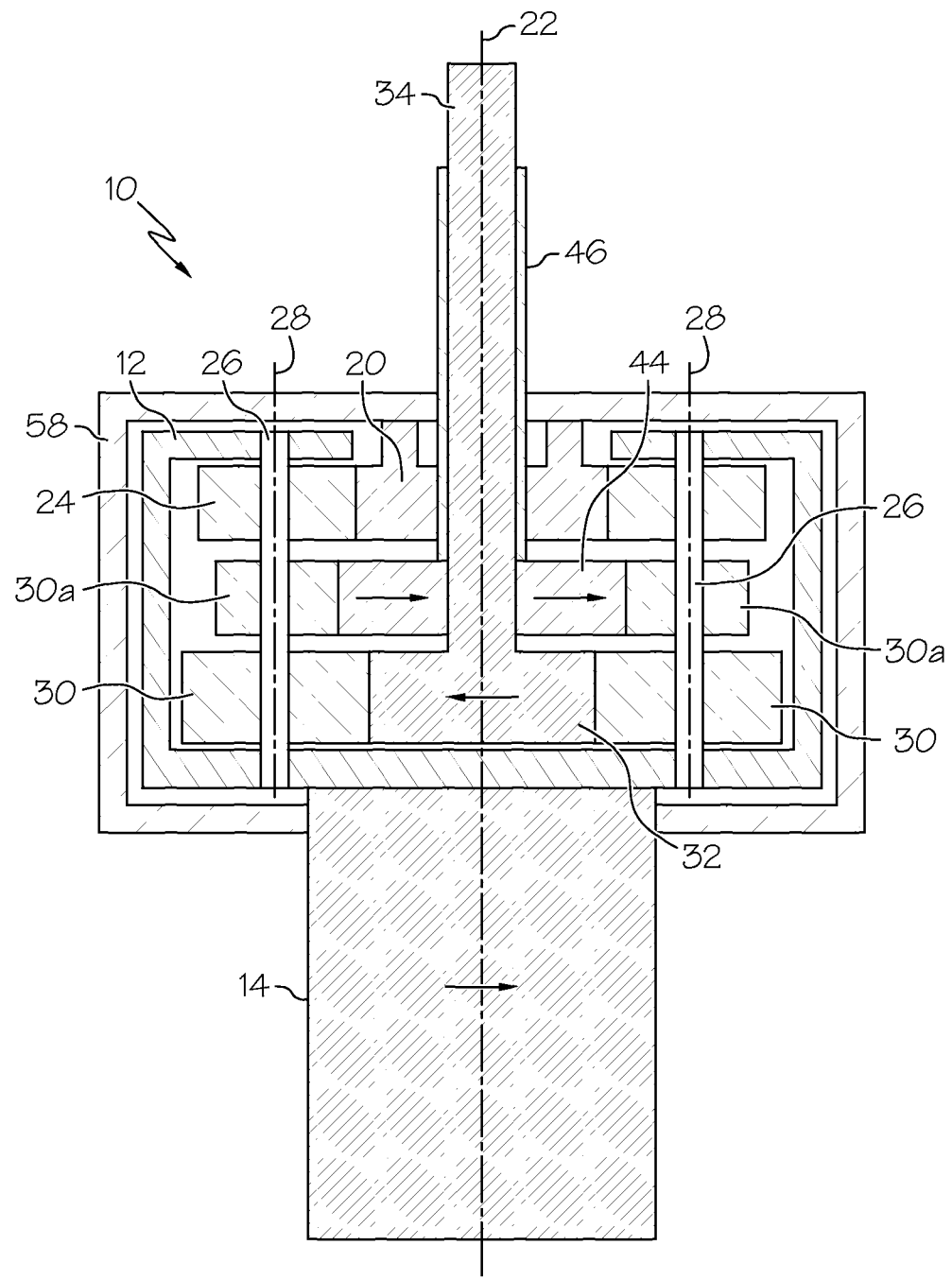
FIG. 5 is a cross-sectional view of yet another embodiment of a gearbox assembly.

In some embodiments, as shown in FIG. 5, the input shaft 14 is coaxial with the coaxial output shafts 34 and 46 about the central axis 22. The input shaft 14 is secured to the yoke 12 such that rotation of the input shaft 14 rotates the yoke 12. The yoke 12 rotates about the stationary gear 20 which is fixed in a gearbox housing 58. Rotation of the yoke 12 about the central axis 22 drives the planetary gears 24 which causes rotation of the pins 26 and the attached intermediate gears 30 and 30a. Rotation of the intermediate gears 30 drives rotation of the output gear 32 and its associated output shaft 34 while rotation of the intermediate gears 30a drives rotation of the secondary output gear 44 and its associated secondary output shaft 46. The relative speed and direction of the rotation of the output shaft 34 and the secondary output shaft 46 can be established by sizing the output gear 32 and the secondary output gear 44 accordingly relative to the stationary gear 20. While two coaxial output shafts 34 and 46 are shown in FIG. 5, it is to be appreciated that the gearbox assembly 10 may be adapted to drive any number of output shafts for example, three or four output shafts, by providing additional sets of intermediate gears 30 to mesh with additional output gears 32.

Figure 6:
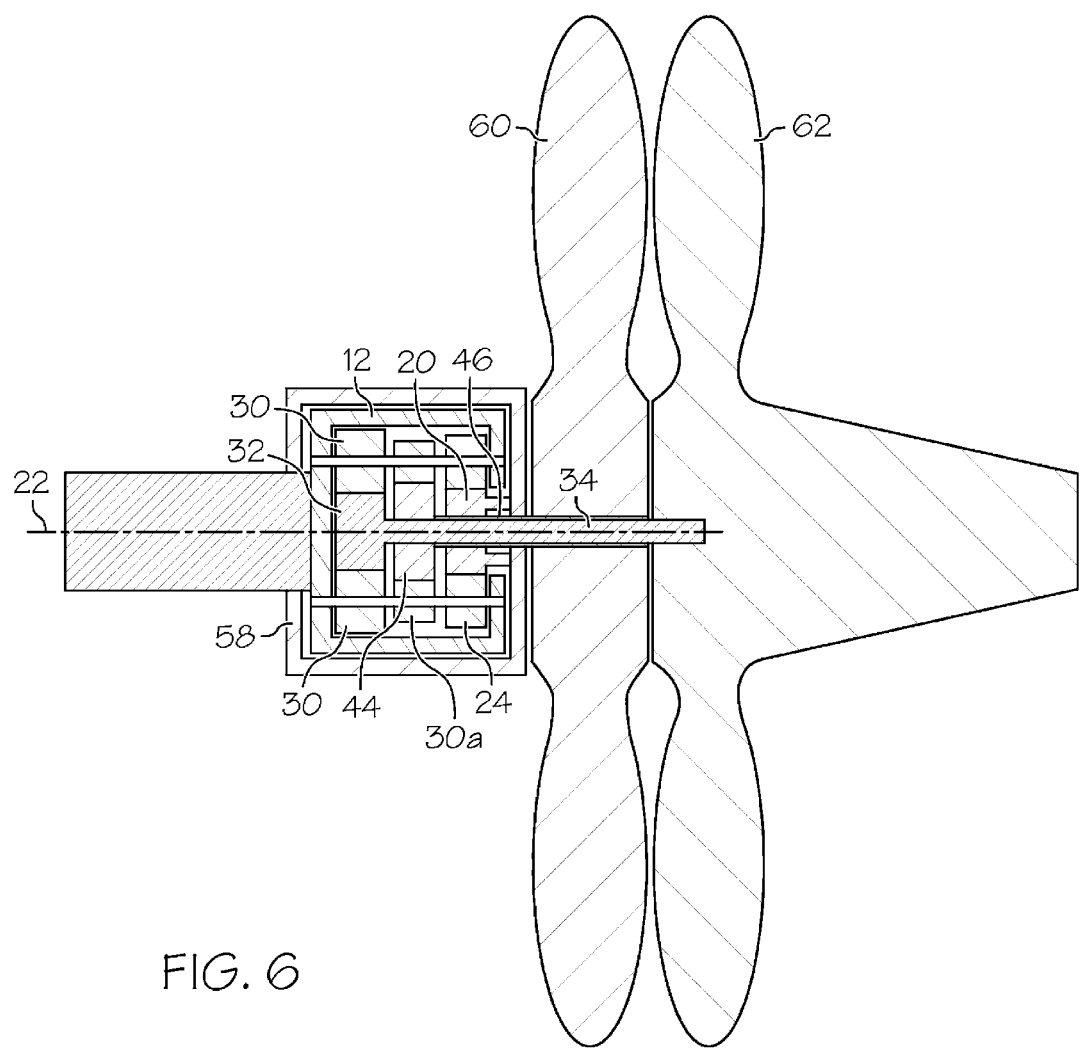
FIG. 6 is a cross-sectional view of yet another embodiment of a gearbox assembly.

As shown in FIG. 6, the gearbox assembly 10 may be oriented to drive counter-rotating propellers 60, 62 of, for example, an aircraft.

By reducing a number of parts and a number of gear sets over prior art gearboxes, the embodiments of gearboxes described herein provide a substantial savings in weight, complexity and size over prior art gearboxes. Further, the gearboxes described herein have the ability to adapt to different gear reduction requirements via a simple change in relative size between the output gear 32 and the stationary gear 20. Also, the disclosed gearboxes can be adapted to output to multiple output shafts 34 via the addition of additional intermediate gears 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gearbox assembly comprising:
   a yoke operably connectable to an input shaft and rotatable about a stationary gear disposed at a central axis, the yoke operably connected to the input shaft via a spline connection at an outer perimeter of the yoke;
   a planetary gear rotatably disposed in the yoke and meshable with the stationary gear such that rotation of the yoke about the stationary gear drives rotation of the planetary gear about a pin axis via the mesh between the planetary gear and the stationary gear;
   a first intermediate gear disposed substantially coaxially with the planetary gear and operably connected to the planetary gear such that rotation of the planetary gear about the pin axis drives rotation of the first intermediate gear about the pin axis;

a second intermediate gear disposed substantially coaxially with the first intermediate gear and connected to the planetary gear such that rotation of the planetary gear about the pin axis drives rotation of the second intermediate gear about the pin axis;

a first output gear disposed at the central axis and operably meshed to the first intermediate gear; and a second output gear disposed at the central axis substantially coaxially with the first output gear, the second output gear operably meshed to the second intermediate gear.

2. The gearbox assembly of claim 1 wherein the first output gear and the second output gear are rotatable in opposing directions about the central axis.

3. The gearbox assembly of claim 1 wherein the first output gear is operably connectable to at least one output shaft.

4. The gearbox assembly of claim 1 wherein the first intermediate gear and the planetary gear are disposed at a pin rotatably secured in the yoke.

5. The gearbox assembly of claim 1 wherein the at least one output gear is coaxial with the input shaft.

6. A powertrain for a rotary wing aircraft comprising:
an engine having an engine shaft;
a gearbox assembly including:
a yoke operably connected to the engine shaft and rotatable about a stationary gear disposed at a central axis, the yoke operably connected to the engine shaft via a spline connection at an outer perimeter of the yoke;
a planetary gear rotatably disposed in the yoke and meshable with the stationary gear such that rotation of the yoke about the stationary gear drives rotation of the planetary gear about a pin axis via the mesh between the planetary gear and the stationary gear;
a first intermediate gear disposed substantially coaxially with the planetary gear and operably connected to the planetary gear such that rotation of the planetary gear about the pin axis drives rotation of the first intermediate gear about the pin axis;
a second intermediate gear disposed substantially coaxially with the first intermediate gear and connected to the planetary gear such that rotation of the planetary gear about the pin axis drives rotation of the second intermediate gear about the pin axis;
a first output gear disposed at the central axis and operably meshed to the first intermediate gear;
a second output gear disposed at the central axis substantially coaxially with the first output gear, the second output gear operably meshed to the second intermediate gear; and at least one rotor operably connected to the first output gear and/or the second output gear.

7. The powertrain of claim 6 wherein the at least one rotor is operably connected to the first output gear via a first output shaft.

8. The powertrain of claim 6 wherein the first intermediate gear and the planetary gear are disposed at a pin rotatably secured in the yoke.

9. The powertrain of claim 6 wherein the first output gear is coaxial with the engine shaft.

10. A method of rotational energy transmission comprising:
disposing a stationary gear at a central axis;
operably connecting a yoke to an input shaft via a spline connection at an outer perimeter of the yoke, the yoke rotatable about the stationary gear;
disposing a planetary gear in the yoke, the planetary gear being meshed to the stationary gear;
operably connecting a first intermediate gear to and coaxial with the planetary gear at a pin axis;
operably connecting a second intermediate gear to and coaxial with the planetary gear at the pin axis;
disposing a first at the central axis, the first output gear being meshed with the first intermediate gear;
disposing a second output gear at the central axis and coaxially with the first output gear, the second output gear being meshed with the second intermediate gear; and
urging rotation of the yoke about the central axis such that the rotation of the yoke about the central axis urges rotation of the planetary gear about the pin axis thereby driving rotation of the first intermediate gear about the pin axis thereby rotating the first output gear about the central axis, and the rotation of the planetary gear about the pin axis driving rotation of the second intermediate gear about the pin axis thereby rotating the second output gear about the central axis.

11. The method of claim 10 further comprising driving rotation of a first output shaft operably connected to the first output gear via rotation of the first output gear about the central axis.

12. The method of claim 10 further comprising rotating the yoke about the central axis in a first direction and rotating the first output gear about the central axis in a second direction opposite the first direction.

* * * * *